United States Patent
Buchanan, Jr.

(10) Patent No.: US 7,185,390 B2
(45) Date of Patent: Mar. 6, 2007

(54) ENERGY ABSORBING PEDESTRIAN SAFETY FEATURE FOR VEHICLE WIPER PIVOT APPARATUS

(75) Inventor: Harry Charles Buchanan, Jr., Dayton, OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 562 days.

(21) Appl. No.: 10/331,932

(22) Filed: Dec. 30, 2002

(65) Prior Publication Data
US 2004/0123412 A1 Jul. 1, 2004

(51) Int. Cl.
B60S 1/16 (2006.01)
B60S 1/18 (2006.01)
B60S 1/06 (2006.01)
B60S 1/34 (2006.01)

(52) U.S. Cl. ............... 15/250.31; 15/250.3; 15/250.34; 29/592

(58) Field of Classification Search ............. 15/250.34, 15/250.3, 250.31; 296/96.15, 96.17
See application file for complete search history.

(56) References Cited

U.S. PATENT DOCUMENTS

| | | | |
|---|---|---|---|
| 4,072,635 A | 2/1978 | Jeram | |
| 4,718,712 A | 1/1988 | Nakatani | |
| 4,943,102 A | 7/1990 | Hamamoto et al. | |
| 5,774,928 A * | 7/1998 | Schitter et al. | 15/250.34 |
| 6,216,309 B1 | 4/2001 | Goto et al. | |
| 6,237,185 B1 | 5/2001 | Goto et al. | |
| 6,254,167 B1 | 7/2001 | Goto et al. | |
| 6,505,376 B1 | 1/2003 | Kagawa | |
| 6,513,186 B1 | 2/2003 | Zimmer | |
| 6,845,540 B1 * | 1/2005 | Bissonnette et al. | 15/250.31 |
| 2002/0083544 A1 | 7/2002 | Masuda | |
| 2003/0001407 A1 | 1/2003 | Hoshikawa et al. | |

FOREIGN PATENT DOCUMENTS

| | | |
|---|---|---|
| EP | 0 916 559 | 5/1999 |
| EP | 1 074 442 | 2/2001 |
| EP | 1 083 101 | 3/2001 |
| GB | 2 327 598 | 2/1999 |
| GB | 2 347 340 | 9/2000 |
| JP | 11 301420 | 11/1999 |
| JP | 2000062575 | 2/2000 |
| JP | 20000326830 | 11/2000 |

* cited by examiner

Primary Examiner—Gary K. Graham
(74) Attorney, Agent, or Firm—Young Basile

(57) ABSTRACT

A wiper arm pivot is rotatably mounted in a pivot holder fixedly securable to vehicle structure. The wiper arm pivot is telescopingly displacable in the pivot holder upon an impact load on one end of the wiper arm pivot. An energy absorption material has a gel state when disposed in the pivot holder and flows through one or more orifices from the pivot holder under impact forces causing telescoping movement of the pivot in the pivot holder absorption of the impact force on the pivot shaft. In another aspect, the energy absorption material is a liquid which is retained within the pivot holder by a releasable plug which is separable from the orifice under a predetermined impact pressure.

43 Claims, 2 Drawing Sheets

ENERGY ABSORBING PEDESTRIAN SAFETY FEATURE FOR VEHICLE WIPER PIVOT APPARATUS

BACKGROUND

The present invention relates, in general, to vehicle windshield wiper assemblies and, more specifically, to vehicle windshield wiper assemblies having pedestrian collision safety features.

In vehicle windshield wiper assemblies, wiper blades are mounted on wiper arms. The wiper arms, in turn, carry a mount which is attached to a rotatable pivot shaft. The pivot shaft is rotatably mounted in a pivot shaft housing or holder fixedly mounted on vehicle structure, such as on the vehicle plenum or cowl panel immediately below the lower edge of the vehicle windshield. Although two wiper blades and wiper arms are normally provided on a single windshield, only one of the wiper pivot shafts is typically coupled by a drive lever to a drive source, such as an electric motor. Linkages connect the pivot shaft of one wiper arm to the pivot shaft of the other wiper arm to impart reciprocal motion to both pivot shafts when the motor reciprocally drives the drive lever.

Recent studies have shown that pedestrians have a high likelihood of injury when struck by a vehicle traveling at above certain speeds. Such injuries occur when the pedestrian is thrown by impact with the front bumper or front fenders of the vehicle hood onto the hood where the pedestrian's head and/or torso then contacts the windshield with considerable force.

Although windshield wiper assemblies are provided in a large number of different configurations, typical wiper assemblies have the upper end of the pivot shaft and the wiper arm attached thereto protruding above an impact line usually defined by the exterior surface of the vehicle hood. As the pivot shaft, although rotatable in the pivot holder, is nevertheless axially fixed relative to the vehicle structure, the protruding portions of the wiper assembly act as a fixed object or projection which increases the likelihood of serious injury to a pedestrian during a collision.

Certain countries or regional groups have initiated legislation to protect pedestrians and other road users in the event of a collision with a vehicle. Under such legislation, manufacturers will have to insure that the pivot shafts of windshield wiper assemblies do not act as an external projection during a pedestrian collision with a vehicle.

As a result, windshield wiper manufacturers have provided a number of different pivot shaft mounting arrangements which are capable of pivoting below the hood impact line or breaking away from the fixed mount to the vehicle structure and dropping below the vehicle hood so as to lower the protruding portion of the pivot shaft and the wiper arm below the impact line during a pedestrian collision.

However, providing a pivot shaft mounting design which is capable of pivotal movement under impact is directly opposed to the wiper system requirements of a solid mount for torsional loading and radial force management. In current pivot housing assemblies, the pivot shaft is solidly mounted in the axial direction in the pivot shaft housing. The pivot shaft is constrained within the pivot housing by various methods. One example utilizes a solid ring with full contact to the pivot shaft so as to exert a retaining force on the pivot assembly. Another example is an E-clip retaining ring that fits into a slot on the pivot shaft and mechanically retains the pivot shaft in the pivot shaft housing. On the other end of the pivot shaft, the pivot assembly is constrained by the interference caused by embedded knurling in the pivot shaft and the interference hole in the mating drive plate when the two pieces are mechanically riveted together.

While this current pivot shaft housing design has sufficient strength in both the axial and radial directions so as to meet current federal and customer requirements, the design is ineffective in minimizing injury from the impact load of a pedestrian.

Such prior pivot shaft mounting designs which provide break-away or pivot functions, do not remain in a workable wiper operating position after movement thereby rendering the entire wiper system inoperative. This prevents the vehicle from being used after a collision to at least enable the driver to proceed to home or a repair location with reduced wiper operability.

Another wiper apparatus has been designed with a pedestrian safety feature. This design uses an axially displacable, biased pivot shaft. A spring acts on a wiper arm pivot mounting to maintain the wiper pivot shaft in a normal wiper operating position. Impact forces acting on the wiper pivot shaft overcome the biasing force provided by the spring and enable the pivot shaft to axially displace under the impact forces below the vehicle hood impact line to prevent substantial contact between a pedestrian and the exposed portions of the pivot shaft during a pedestrian/vehicle collision. Once the impact forces are removed from the pivot shaft, the spring biases the pivot shaft back to the normal wiper operating position, assuming that little substantial damage has been inflicted on the wiper arm and pivot shaft.

What is still needed is a vehicle windshield wiper apparatus having a rotatable wiper pivot shaft which meets wiper system requirements for torsional and radial force loading while still being capable of controlled axial displacement below the vehicle hood impact line to prevent substantial contact between a pedestrian and the exposed portions of the pivot shaft and/or wiper arm during a pedestrian/vehicle collision. It would also be desirable to provide a vehicle windshield wiper apparatus which provides energy absorption during pedestrian impact with the wiper arm or pivot shaft to minimize impact forces on the pedestrian and to provide a control collapse of the pivot shaft below the vehicle hood impact line. It would also be desirable to provide a vehicle windshield wiper apparatus having an axially displacable pivot shaft which is lowerable below the vehicle hood impact line to a collapsed position which still provides a reduced amount of wiper operability for continued wiper operation assuming little substantial damage to the wiper arm and/or pivot shaft during a pedestrian/vehicle collision.

SUMMARY

The present invention is a vehicle wiper pivot housing with an energy absorbing, axially displacable pivot shaft uniquely which meets the requirements of solid wiper system mounting for torsional loading and radial force and an impact load pivot shaft displacement and energy absorption capability for pedestrian safety during a pedestrian/vehicle collision. This pedestrian safety feature is provided in a manner which enables the wiper pivot to be lowered under impact forces in a controlled, energy absorbing manner to a lower position which minimizes the exposure of the pivot shaft and the wiper arm above the vehicle hood impact line while still positioning the pivot shaft and the wiper arm in an operable position providing at least a minimal amount of wiper operability for wiper operation during movement of the vehicle from the collision site.

In one aspect, the wiper apparatus includes a pivot holder which is adapted to be fixedly mounted to the vehicles. A wiper arm pivot is rotatably mounted in the pivot holder. The wiper arm pivot is adapted for carrying a wiper arm at one end. One end of the wiper pivot nominally extends exteriorly of vehicle structure for receiving the wiper arm when the wiper pivot is in a normal wiping operation position. The wiper pivot is axially displacable under a predetermined impact force exerted on the exposed end of the wiper pivot in an amount to lower the exposed end of the wiper pivot below the surrounding vehicle structure, with energy absorption for a controlled low impact collapse.

The wiper apparatus of the present invention provides a unique axially displacable wiper arm pivot which is capable of axial displacement relative to the surrounding fixed pivot holder upon the imposition of a predetermined impact force on an end of the wiper arm pivot normally exposed above with energy absorption. The axial displacement is controlled to allow the external end of the wiper arm pivot to retract below the surrounding vehicle structure to minimize fixed contact between the wiper arm pivot and a pedestrian impacting with the vehicle structure during a collision. At the same time, the axial displacable wiper arm pivot retains sufficient strength in the axial and radial directions to provide a solid mount for torsional loading and radial force management for wiper arm movement.

In one aspect of the present invention, the energy absorption means is an elastomeric material, such as an organosiloxane gel, which is in a semi-solid or gel state over the normal operating temperature range of a vehicle, but is flowable and extrudable through an orifice or orifices in the pivot housing when the wiper pivot telescopes under pressure within the pivot housing under a sufficiently high impact force exerted on the pivot. This creates a resistance to uncontrolled telescoping movement of the pivot shaft and absorbs at least a substantial portion of the impact force exerted on the pivot shaft for enhanced pedestrian safety.

In another aspect of the invention, a biasing means, such as a small force spring may be mounted on the pivot shaft in a manner to bias the pivot shaft back to the normal wiper operating position after a telescoping, collapsing movement to provide operability of the wiper system assuming no other substantial damage to the wiper system, after a pedestrian impact.

In one aspect, the present invention is a wiper apparatus for a vehicle including a pivot holder adapted to be fixedly mounted on a vehicle, a wiper arm pivot rotatably mounted in the pivot holder, and energy absorption means, disposed within the pivot holder and acting on the pivot, to retain the pivot in a normal wiper arm operating position, but extrudable from the pivot holder to control the telescoping movement of the pivot within the pivot holder under impact forces acting on the pivot.

In another aspect, the invention is a wiper apparatus for a vehicle including a pivot holder adapted to be fixedly mounted on a vehicle, a wiper arm pivot rotatably mounted in the pivot holder, a pivotally movable drive member non-rotatably coupled to the wiper arm pivot, the wiper arm pivot being rotatable by pivotal movement of the drive member, and energy absorption means, disposed within the pivot holder and acting on the pivot to retain the pivot in a normal wiper arm operating position, but extrudable from the pivot holder to control the telescoping movement of the pivot within the pivot holder under impact forces acting on the pivot.

In another aspect, the invention is a method for manufacturing a wiper pivot apparatus capable of lowering a vehicle wiper arm attached to the wiper pivot apparatus between a first normal wiping position to a second lower position under a predetermined impact force, the method comprising the steps of:

mounting a wiper arm pivot adapted to carry a wiper arm at a first end in a pivot holder adapted to be fixed to a vehicle;

forming the wiper arm pivot of a pivot shaft telescopingly movable from a first position placing the wiper arm in a normal wiping position on the vehicle to a second position telescoped within the pivot holder; and placing energy absorption material in a semi-rigid gel-like state between the inner pivot shaft and the outer pivot shaft which extrudes through an orifice in the outer pivot shaft to allow the telescoping movement of the inner pivot shaft between the first and second positions under a predetermined impact force on the pivot shaft.

The wiper apparatus of the present invention provides a uniquely axial displacable wiper arm pivot which is capable of axial displacement relative to the surrounding fixed pivot holder upon the imposition of a predetermined impact force on the end of the wiper arm pivot normally exposed above a vehicle hood impact line. This axial displacement is uniquely provided with energy absorption to absorb the impact forces.

BRIEF DESCRIPTION OF THE DRAWING

The various features, advantages and other uses of the present invention will become more apparent by referring to the following detailed description and drawing in which.

DETAILED DESCRIPTION

Referring now to FIGS. 1–4, there is depicted various aspects of a vehicle windshield wiper apparatus 10, which is only partially shown, as the present wiper apparatus 10 may be employed with many different wiper arm configurations.

As a large number of the components in a vehicle windshield wiper apparatus are conventional, such are not shown in order that the features of the present invention may be more clearly identified. However, it will be understood that the wiper apparatus 10 utilizes a drive motor connected by a drive lever 13 to a pivot shaft 12 rotatably mounted in a pivot shaft holder or housing 14.

Figure 1:
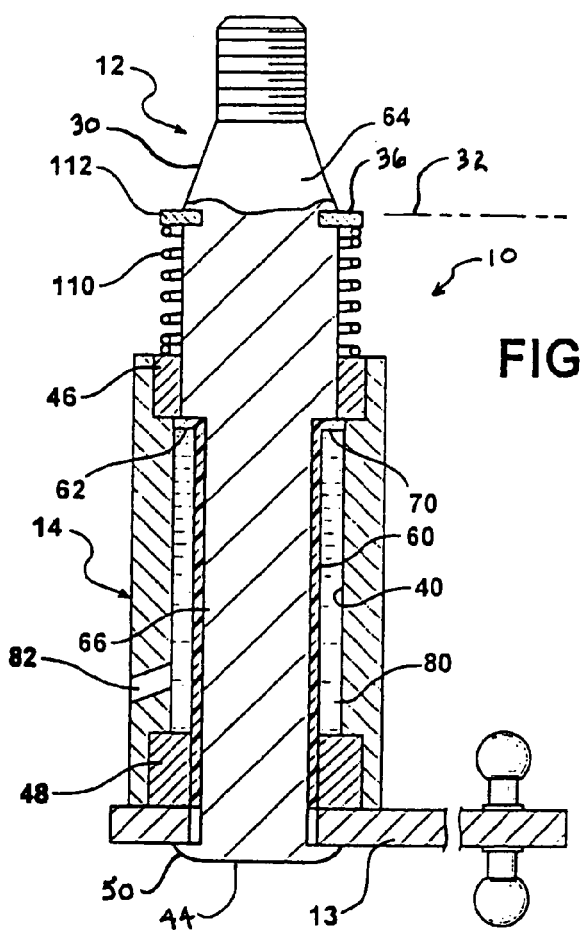
FIG. 1 is a partially cross-sectioned, side elevational view of a vehicle wiper pivot in accordance with one aspect of the present invention shown in a normal wiping position.

As shown in FIG. 1, at least an upper portion 30 of the pivot shaft 12 is disposed exteriorly of an impact line 32 which is generally formed by a major plane or edge of a vehicle hood, not shown. The exposed end 30 of the pivot shaft 12, which receives a not shown wiper arm, is disposed adjacent to a bottom edge of a vehicle windshield, also not shown.

Movement of the drive plate 13 is generated by rotation of the output shaft of the wiper drive motor, not shown, and imparts bi-directional rotation to the pivot shaft 12 in a conventional manner. However, a clip 36 restrains the pivot shaft 12 in an upward direction from the pivot housing 14.

Also mounted in the through bore 40 are first and second bushings 46 and 48 which are disposed between the inner surface of the bore 40 and the pivot shaft 12. Another retainer or C-clip 50 is disposed on the second end 44 of the pivot housing 14 and engages a slot formed at a second end 52 of the pivot shaft 12 to axially restrain the pivot shaft 12 relative to the pivot housing 14.

In this aspect of the present invention, the pivot shaft 12 is mounted in the pivot shaft housing 14 for selective axial displacement in the direction to lower the normally exposed or external end 30 of the pivot shaft 12 below the vehicle impact line 32 under an impact load on the exposed end 30 of the pivot shaft 12.

The wiper apparatus 10 shown in FIG. 1 is depicted by example as a bottom drive-type wiper apparatus wherein the drive plate 13 is mounted on a bottom or lower end of the pivot shaft 12.

The second end 52 of the pivot shaft 12 may be formed with an enlarged head as shown in FIG. 1 which is press-fit or swaged to the drive plate 13 to non-rotatably fix the pivot shaft 12 to the drive plate 13 for rotation of the pivot shaft 14 upon pivotal movement of the drive plate 13.

An optional bearing sleeve 60 is disposed in the bore 40 of the pivot housing 14 between a shoulder 62 defining a larger diameter upper end 64 of the pivot shaft 12 and a smaller diameter second or lower end 66 of the pivot shaft 12. The sleeve 60 may be formed of a suitable bearing material, such as Delrin AF sold by Dupont. The sleeve 60 has an enlarged diameter flange 70 at an upper end which seats against the shoulder 62 in the pivot shaft 12.

The sleeve 60 is disposed radially inward of and spaced from the inner wall defining the bore 40 in the pivot housing 14. This creates a cavity between the radially outermost surface of the sleeve 60 and the inner diameter surface of the bore 40 in the pivot housing 14.

Figure 2:
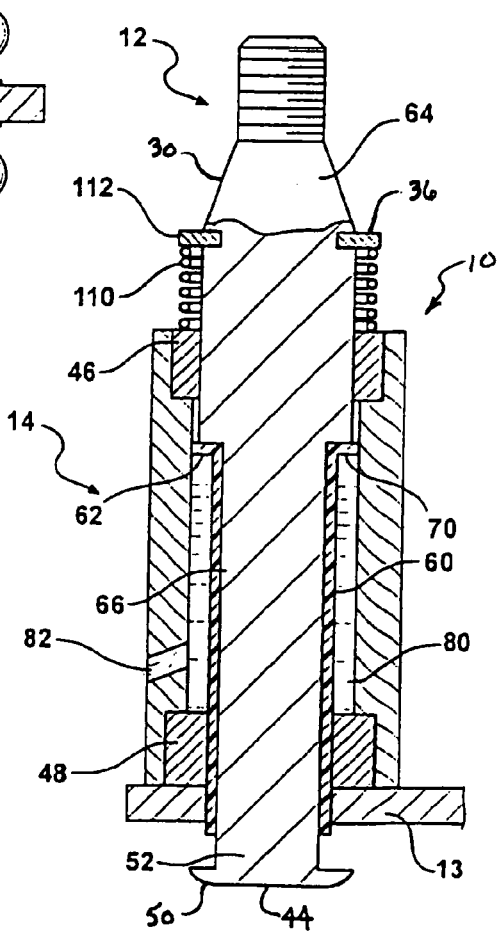
FIG. 2 is a cross-sectional view, similar to FIG. 1, but showing the pivot shaft in a collapsed position.

An energy absorption means or material 80 is disposed in the cavity. According to the present invention, the energy absorption means or material 80 is in the form of a flowable mass which is injected under pressure into the cavity in the bore 40 of the pivot housing 14 through at least one orifice 82 extending through the wall of the pivot housing 14 as shown in FIGS. 1 and 2.

In one aspect, the energy absorption material 80 is a reaction product silicone gel such as an organosiloxane, which has a gel-like state under normal vehicle operating temperatures of between −40° F. and 200° F., This material 80, when in the gel state, is capable of exerting sufficient biasing force on the shoulder 62 of the pivot shaft 12 to retain the pivot shaft 12 in the first, normal wiper operating position shown in FIG. 1. However, a high impact force exceeding a predetermined force level on the first end of the pivot shaft 12, such as an impact force resulting from a pedestrian impacting on the pivot shaft during a collision with a vehicle, causes the material 80 to transfer stress uniformly and to flow or extrude out of the cavity through the orifice 82 to absorb the impact force exerted on the pivot shaft 12 thereby causing a controlled collapse or inward telescoping movement of the pivot shaft 12 with respect to the pivot housing 14. The gel material 80 may extrude in a gel, particulate or powder form. Additional details concerning the structure, use, and manufacture of the material 80 can be had by referring to U.S. Pat. No. 4,072,635, the contents of which are incorporated herein by reference.

Figure 3:
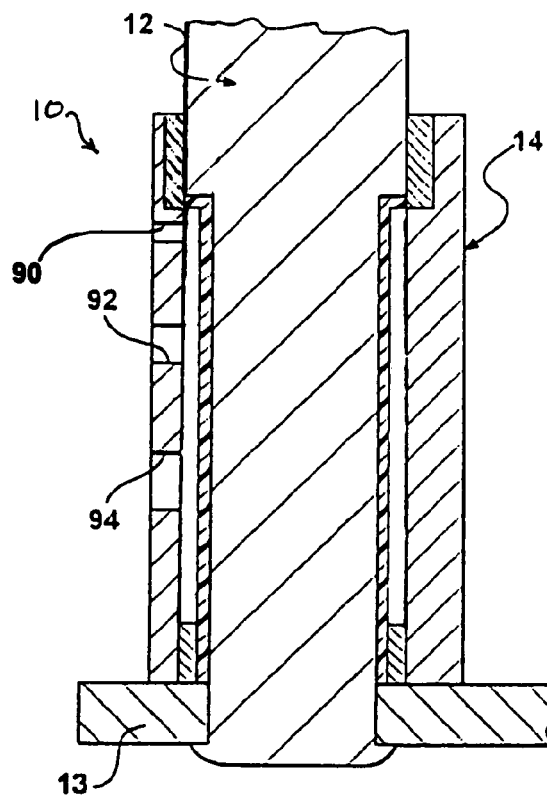
FIG. 3 is a partial, cross-sectional view showing a different optional aspect of the present invention.

As shown in FIG. 3, the orifice 82 may be optionally replaced with a plurality of orifices, with three orifices 90, 92 and 94 being shown by way of example only. The orifices 90, 92 and 94 may be spaced circumferentially about the pivot housing 14 in a common plane or axially spaced along the length of the pivot housing 14 as shown in FIG. 3. Further, the diameter of each aperture 90, 92 and 94 may be identical or different, such as a gradually decreasing diameter from the axially upper most orifice 90 to the axially lower most orifice 94. Alternately, the diameter of the orifices 90, 92 and 94 may increase in diameter from the upper most orifice 90 to the lower most orifice 94. Regardless of the configuration of the orifices 90, 92 and 94, the overall effect is to control the telescoping collapse of the pivot shaft 12 within the pivot housing 14 and absorb the energy exerted on the pivot shaft 12 by a pedestrian impact in a controlled manner to reduce the impact force exerted on the pedestrian by the pivot shaft 12.

Figure 4:
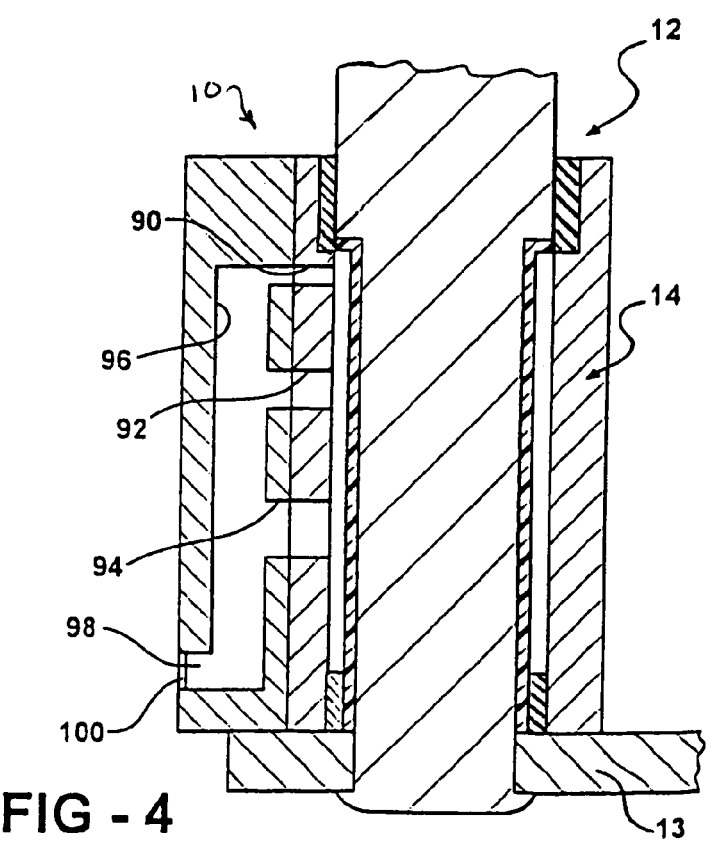
FIG. 4 is a partial, cross-sectional view showing yet another optional aspect of the present invention.

FIG. 4 depicts yet another aspect of the orifice configuration according to the present invention. In this aspect, it being understood that three orifices 90, 92 and 94 are depicted by way of example only, and are each connected to a common manifold 96 formed in the wall of the pivot housing 14 or in an external sleeve outside of the pivot housing 14. The manifold 96 receives the energy absorption material 80 flowing through each of the orifices 90, 92 and 94 and directs the material to at least one common outlet 98.

The outlet 98 may optionally be releasably closed by a blow-out plug or plugs 100 which is forcibly mounted in the orifice 98, but is forcibly ejected from the orifice 98 opening the orifice 98 to fluid flow when a predetermined pressure is exerted on the inner surface of the plug 100 by the material flowing through the manifold 96 during an impact situation. When a releasable plug 100 is employed, the energy absorption material 80 can be a liquid, such as water.

Referring back to FIG. 1, in another aspect of the present invention, an optional spring 110 is mounted about the enlarged diameter portion 64 of the pivot shaft 12 between the upper end of the pivot housing 14 and a clip or flange 112 carried on or fixed to the pivot shaft 12. The optional spring 110 provides a light return force which is easily overcome by impact forces exerted on the pivot shaft 12 to cause the telescoping inward movement of the pivot shaft 12 with respect to the pivot housing 14 as described above during a pedestrian collision; but is capable of returning the pivot shaft 12 back to the normal first position for normal wiper operation assuming that there is no other substantial damage to the entire wiper apparatus preventing such return movement. The spring 110 is also capable of moving the pivot shaft 12 from a totally collapsed position within the pivot housing 14 after a pedestrian/vehicle collision event to any intermediate position lower than the first normal wiper operating position which is capable of providing a temporary or reduced wiping operation during subsequent movement of the vehicle.

In conclusion, there has been disclosed a unique vehicle wiper apparatus have an axially displacable pivot shaft to provide a pedestrian safety feature through absorption of the impact energy acting on the pivot shaft during axial displacement of the pivot shaft caused by a pedestrian impact with an end portion of the pivot shaft to prevent forced, fixed contact between the pedestrian and the pivot shaft. The axial displacement takes place concurrently with energy absorption of the impact force for increased safety to the pedestrian.

An energy absorption material in the form of a semisolid or rigid gel is disposed internally between the pivot shaft and the housing and retains the pivot shaft in the normal wiper operating position under normal wiping and temperature conditions. However, during an impact on the upper end of the pivot shaft, the impact forces cause the energy absorption material to extrude through one or more outlets or orifices in the pivot housing to absorb the impact force energy and cause a controlled collapse of the pivot shaft within the pivot housing.

What is claimed is:

1. A wiper apparatus for a vehicle comprising:
a pivot holder adapted to be fixedly mounted on a vehicle;
a wiper arm pivot rotatably mounted in the pivot holder;
energy absorption means, disposed within the pivot holder and acting on the pivot, to retain the pivot in a normal wiper arm operating position, but flowable from the pivot holder to control the telescoping movement of the pivot within the pivot holder under impact forces acting on the pivot; and
at least one orifice formed in the pivot holder for discharge of the energy absorption means from the pivot holder.

2. The wiper apparatus of claim 1, wherein the energy absorption means comprises:
an extrudable material disposed within the pivot housing.

3. The wiper apparatus of claim 2 wherein the energy absorption means comprises:
an organosiloxane gel.

4. The wiper apparatus of claim 2 wherein the energy absorption means comprises:
a material changing from a gel state to a flowable state at normal vehicle operating temperatures under predetermined force load on the pivot and the material.

5. The wiper apparatus of claim 1 wherein the at least one orifice comprises:
a plurality of orifices.

6. The wiper apparatus of claim 5 wherein:
the plurality of orifices are axially spaced on the pivot holder.

7. The wiper apparatus of claim 5 wherein:
at least two of the plurality of orifices have the same diameter.

8. The wiper apparatus of claim 5 wherein:
the plurality of orifices each have a different diameter.

9. The wiper apparatus of claim 5 wherein:
the plurality of orifices increase in diameter from an upper orifice to a lower orifice.

10. The wiper apparatus of claim 5 wherein:
the plurality of orifices decrease in diameter from an upper orifice to a lower orifice.

11. The wiper apparatus of claim 5 further comprising:
a manifold having at least one outlet and an internal passage disposed in fluid communication with each of the orifices.

12. The wiper apparatus of claim 1 further comprising:
a drive member non-rotatably coupled to the wiper pivot the wiper pivot axially displacable relative to the drive member during telescoping movement of the wiper pivot with respect to the pivot holder.

13. The wiper apparatus of claim 1 further comprising:
a bearing sleeve disposed between the wiper pivot and the inner surface of a bore extending through the pivot holder.

14. The wiper apparatus of claim 1 wherein the energy absorption means comprises:
a liquid disposed under pressure in the pivot holder and acting on the pivot shaft; and
a force releasible plug mounted in an orifice to releasibly close the orifice and retain the liquid within the pivot holder, the plug releasible from the orifice under a predetermined liquid pressure.

15. The wiper apparatus of claim 1 wherein the energy absorption means comprises:
an extrudable material disposed within the pivot housing.

16. The wiper apparatus of claim 15 wherein the energy absorption means comprises:
an organosiloxane.

17. The wiper apparatus of claim 15 wherein the energy absorption means comprises:
a material changing from a gel state to a flowable state at normal vehicle operating temperatures under predetermined force load on the pivot and the material.

18. A wiper apparatus for a vehicle comprising:
a pivot holder adapted to be fixedly mounted on a vehicle;
a wiper arm pivot rotatably mounted in the pivot holder;
energy absorption means, disposed within the pivot holder and acting on the pivot, to retain the pivot in a normal wiper arm operating position, but flowable from the pivot holder to control the telescoping movement of the pivot within the pivot holder under impact forces acting on the pivot; and
biasing means, disposed to act on the wiper pivot, for returning the wiper pivot to a normal wiper arm operating position, after a telescoping movement of the wiper pivot in the pivot holder.

19. A wiper apparatus for a vehicle comprising:
a pivot holder adapted to be fixedly mounted on a vehicle;
a wiper arm pivot rotatably mounted in the pivot holder;
a pivotally movable drive member non-rotatably coupled to the wiper arm pivot, the wiper arm pivot being rotatable by pivotal movement of the drive member;
energy absorption means, disposed within the pivot holder and acting on the pivot for retaining the pivot in a normal wiper arm operating position, but flowable from the pivot holder to control the telescoping movement of the pivot within the pivot holder under impact forces acting on the pivot; and
at least one orifice formed in the pivot holder for discharge of the energy absorption means from the pivot holder.

20. The wiper apparatus of claim 19 wherein the at least one orifice comprises:
a plurality of orifices.

21. The wiper apparatus of claim 20 wherein:
the plurality of orifices are axially spaced on the pivot holder.

22. The wiper apparatus of claim 20 wherein:
at least two of the plurality of orifices have the same diameter.

23. The wiper apparatus of claim 20 wherein:
the plurality of orifices each have a different diameter.

24. The wiper apparatus of claim 20 wherein:
the plurality of orifices increase in diameter from an upper orifice to a lower orifice.

25. The wiper apparatus of claim 20 wherein:
the plurality of orifices decrease in diameter from an upper orifice to a lower orifice.

26. The wiper apparatus of claim 20 further comprising:
a manifold having at least one outlet and an internal passage disposed in fluid communication with each of the orifices.

27. The wiper apparatus of claim 19 further comprising:
a bearing sleeve disposed between the wiper pivot and the inner surface of a bore extending through the pivot holder.

28. The wiper apparatus of claim 19 wherein the energy absorption means comprises:

a liquid disposed under pressure in the pivot holder and acting on the pivot shaft; and a force releasible plug mounted in an orifice to releasibly close the orifice and retain the liquid within the pivot holder, the plug releasible from the orifice under a predetermined liquid pressure.

29. A wiper apparatus for a vehicle comprising:

a pivot holder adapted to be fixedly mounted on a vehicle;

a wiper arm pivot rotatably mounted in the pivot holder;

a pivotally movable drive member non-rotatably coupled to the wiper arm pivot the wiper arm pivot being rotatable by pivotal movement of the drive member;

energy absorption means, disposed within the pivot holder and acting on the pivot for retaining the pivot in a normal wiper arm operating position, but flowable from the pivot holder to control the telescoping movement of the pivot within the pivot holder under impact forces acting on the pivot; and biasing means, disposed to act on the wiper pivot, for returning the wiper pivot to a normal wiper arm operating position, after a telescoping movement of the wiper pivot in the pivot holder.

30. A method for manufacturing a wiper pivot apparatus capable of lowering a vehicle wiper arm attached to the wiper pivot apparatus between a first normal wiping position to a second lower position under a predetermined impact force, the method comprising:

mounting a wiper arm pivot adapted to carry a wiper arm at a first end in a pivot holder adapted to be fixed to a vehicle;

forming the wiper arm pivot of a pivot shaft telescopingly movable from a first position placing the wiper arm in a normal wiping position on the vehicle to a second position telescoped within the pivot holder;

placing energy absorption material between the inner pivot shaft and the outer pivot shaft which extrudes from the outer pivot shaft to allow the telescoping movement of the inner pivot shaft between the first and second positions under a predetermined impact force on the pivot shaft; and forming at least one orifice in the pivot holder for discharge of the energy absorption means from the pivot holder.

31. The method of claim 30 further comprising:

forming the energy absorption material of an extrudable material.

32. The method of claim 30 further comprising:

forming the energy absorption material of an organosiloxane gel.

33. The method of claim 30 further comprising:

forming the energy absorption material of a material changing from a gel state to a flowable state under predetermined force load on the pivot and the material.

34. The method of claim 30 wherein the step of forming the at least one orifice comprises:

forming a plurality of orifices in the pivot holder for discharge of the energy absorption means from the pivot holder.

35. The method of claim 34 further comprising:

axially spacing the plurality of orifices on the pivot holder.

36. The method of claim 34 further comprising:

forming the plurality of orifices with the same diameter.

37. The method of claim 34 further comprising:

forming at least two of the plurality of orifices with a different diameter.

38. The method of claim 34 further comprising:

forming the plurality of orifices with a diameter which increases from an upper orifice to a lower orifice.

39. The method of claim 34 further comprising:

forming the plurality of orifices with a diameter which decreases from an upper orifice to a lower orifice.

40. The method of claim 34 further comprising:

forming a manifold having at least one outlet and an internal passage disposed in fluid communication with each of the orifices.

41. The wiper apparatus of claim 30 further comprising:

forming a bearing sleeve between the wiper pivot and the inner surface of a bore extending through the pivot holder.

42. The method of claim 30 further comprising:

forming the energy absorption material of a liquid disposed under pressure in the pivot holder and acting on the pivot shaft; and mounting a force releasible plug in the orifice to releasably close the orifice and retain the liquid within the pivot holder, the plug releasible from the orifice under a predetermined liquid pressure.

43. A method for manufacturing a wiper pivot apparatus capable of lowering a vehicle wiper arm attached to the wiper pivot apparatus between a first normal wiping position to a second lower position under a predetermined impact force, the method comprising:

mounting a wiper arm pivot adapted to carry a wiper arm at a first end in a pivot holder adapted to be fixed to a vehicle;

forming the wiper arm pivot of a pivot shaft telescopingly movable from a first position placing the wiper arm in a normal wiping position on the vehicle to a second position telescoped within the pivot holder;

placing energy absorption material between the inner pivot shaft and the outer pivot shaft which extrudes from the outer pivot shaft to allow the telescoping movement of the inner pivot shaft between the first and second positions under a predetermined impact force on the pivot shaft; and disposing a biasing means to act on the pivot shaft for returning the wiper pivot to a normal wiper arm operating position, after a telescoping movement of the wiper pivot in the pivot holder.

* * * * *

UNITED STATES PATENT AND TRADEMARK OFFICE
CERTIFICATE OF CORRECTION

| | | |
|---|---|---|
| PATENT NO. | : 7,185,390 B2 | Page 1 of 1 |
| APPLICATION NO. | : 10/331932 | |
| DATED | : March 6, 2007 | |
| INVENTOR(S) | : Harry Charles Buchanan, Jr. | |

It is certified that error appears in the above-identified patent and that said Letters Patent is hereby corrected as shown below:

Column 7, Line 18, (Claim 2), Delete the comma "," from the phrase "claim 1,".
Column 7, Line 52, (Claim 12), Insert a comma --,-- after the phrase "the wiper pivot".
Column 9, Line 11, (Claim 29), Replace "to the wiper arm pivot the wiper arm pivot being" with --to the wiper arm pivot, the wiper arm pivot being--.

Signed and Sealed this

Seventh Day of August, 2007

JON W. DUDAS
*Director of the United States Patent and Trademark Office*